United States Patent [19]

Ritze

[11] 4,106,946
[45] Aug. 15, 1978

[54] STEEP ABSORPTION EDGE FILTER GLASS

[75] Inventor: Willi Ritze, Mainz-Mombach, Fed. Rep. of Germany

[73] Assignee: Jenaer Glaswerk Schott & Gen., Mainz, Fed. Rep. of Germany

[21] Appl. No.: 795,451

[22] Filed: May 9, 1977

[30] Foreign Application Priority Data

May 15, 1976 [DE] Fed. Rep. of Germany ....... 2621741

[51] Int. Cl.$^2$ .......................... C03C 3/04; C03C 3/30
[52] U.S. Cl. .................... 106/52; 106/47 Q; 106/54; 252/300
[58] Field of Search .............. 106/47 Q, 52, 54; 252/300

[56] References Cited

U.S. PATENT DOCUMENTS

| 1,864,858 | 3/1930 | Rising | 106/54 |
| 3,754,816 | 8/1973 | Ritze | 106/54 |
| 3,773,530 | 11/1973 | Morgan | 106/54 |

Primary Examiner—O. R. Vertiz
Assistant Examiner—Mark Bell
Attorney, Agent, or Firm—Millen & White

[57] ABSTRACT

A glass suitable for filters with steep absorption edges in the wavelength range of 455 to 850 nm, consisting essentially of:

40 – 63 weight % $SiO_2$
8 – 30 weight % alkali metal oxides
14 – 30 weight % ZnO
0.9 – 9 weight % $TiO_2$
0 – 9 weight % $B_2O_3$
0 – 2.5 weight % $P_2O_5$
0 – 1.5 weight % $Al_2O_3$
0 – 2 weight % F
0 – 2 weight % CdO
0 – 2.5 weight % CdTe
0 – 1.65 weight % ZnS
0 – 2.0 weight % CdS
0 – 0.9 weight % S
0 – 0.9 weight % Se
0 – 0.8 weight % $As_2S_3$ or $As_2S_4$ or a mixture thereof
0 – 0.5 weight % $Sb_2S_3$ or $Sb_2S_5$ or a mixture thereof
0 – 6 weight % MgO
0 – 15 weight % CaO
0 – 8 weight % BaO
0 – 12 weight % SrO with the provision that the total of MgO, CaO, BaO, SrO, ZnO and CdO is not higher than 36% by weight, and that the minimum content of the colloidal coloring components consisting of one or more of CdO, CdTe, ZnS, CdS, S and Se or of any combination thereof is 0.5% by weight.

13 Claims, 1 Drawing Figure

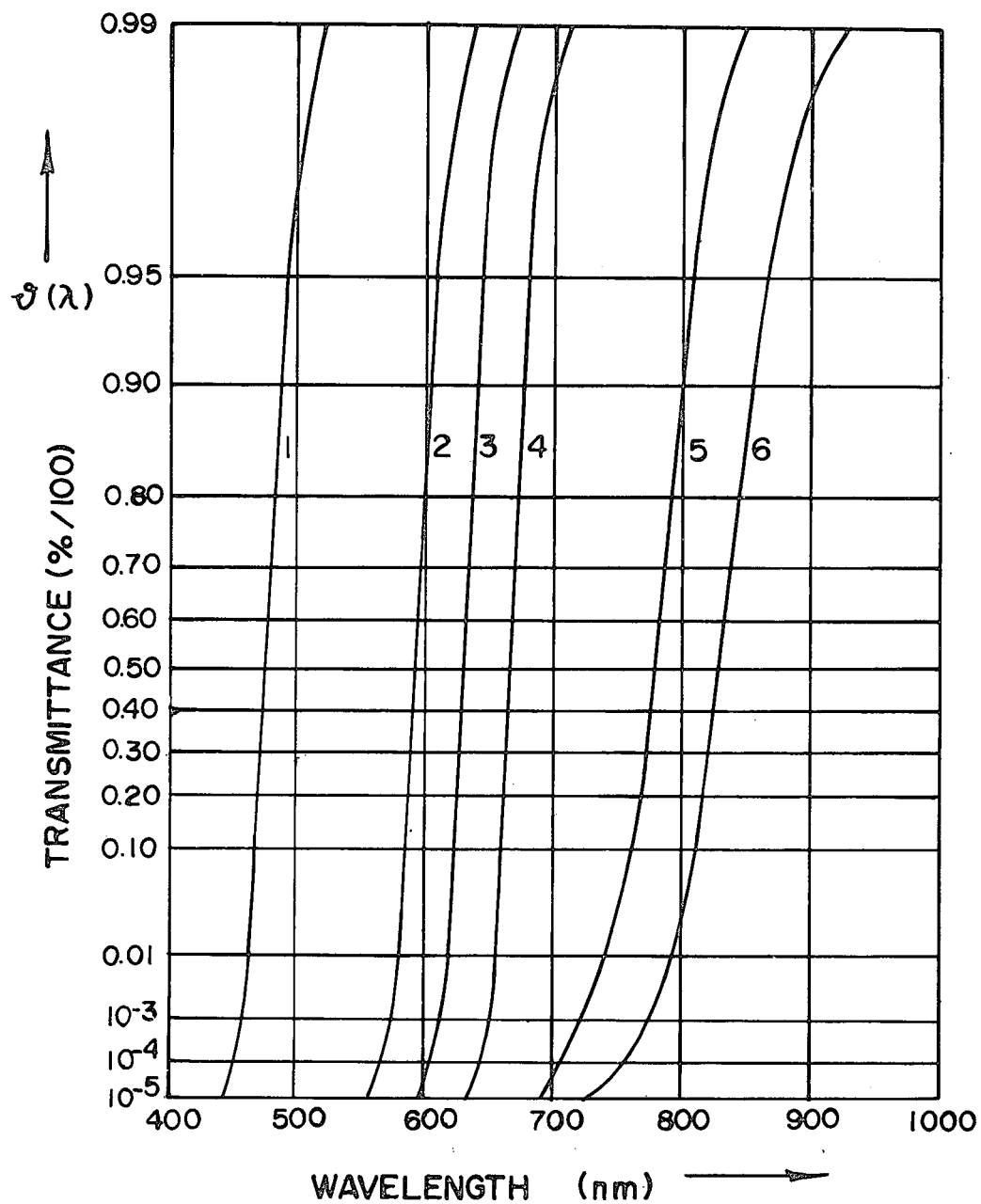

STEEP ABSORPTION EDGE FILTER GLASS

BACKGROUND OF THE INVENTION

This invention relates to glass compositions and especially to glass for filters having steep absorption edges in the wavelength range $\lambda$ = 455 to 850 nm combined with an internal transmittance of $\geq$ 0.80, and which have good chemical stability, increased Knoop hardness, and greatly reduced viscosity in the melting range, thus facilitating the production of glass having a high optical quality.

Yellow, orange, red, and infrared glass filters having a selectively decreasing absorption band in the spectral range from $\lambda$ 455 to 850 nm combined with an internal transmittance of $\geq$ 0.80 are known, for example from DT-OS 20 26 485 and from U.S. Pat. No. 3,773,530, said glasses being obtained by "colloidal coloring" CdS + S + Se + Te into $SiO_2$-ZnO-CaO-BaO alkali metal oxide glasses followed by an annealing step. These colored glasses, however, have one or more of the following disadvantages:

1. Because of the excessively high viscosity of certain base glasses which have good chemical resistance, it is not possible to ensure that the incorporation of the coloring system can be conducted within the homogenization range of the base glass. Consequently, bubble quality may be impaired owing to post-gasification, and this is extremely detrimental to the cord quality of steep edge filters, because effective homogenization or an intensive stirring technique cannot be applied in these cases. Furthermore, an excessively high viscosity of a glass melt results in the displacement of the absorption edge in the infrared direction, this displacement being regarded as completed at a wavelength of 640 nm.

2. Glasses of a limited optical quality and having high contents of alkali metal oxide and ZnO tend to develop flaws during processing, cementing, and polishing. Whereas the stable incorporation of the coloring substances is possible with glass systems having a high alkali content if the viscosity values are above 3500 poises, in this viscosity range, the intensive mechanical stirring techniques intended to achieve good optical homogeneity of glass pastes are likely not to function as desired.

3. With regard to hardness properties, all glasses previously known, specifically having "colloidal coloring", come within a limit of $\pm$ 20 $kp/mm^2$ (with a load of 200p), starting from the mean Knoop hardness value of 420 $kp/mm^2$; otherwise they show considerable lightening of the absorption background. This factor substantially restricts the field of application of these steep edge filters in photometry.

4. The production of known colored glasses with "colloidal coloring" is subject to very strict melting conditions. Fluctuations with respect to the steepness and position of the absorption edge must be expected from one melt to another. Also, because of their excessive viscosity in the melting range, they are not suitable for the continuous production of steep edge filter glasses of optical quality.

SUMMARY OF THE INVENTION

An object of this invention is to provide glasses having a novel composition, and particularly compositions which permit the production of optical steep edge filters with optimum absorption edges and a good absorption background in the wavelength range from $\lambda$ 455 nm to $\lambda$ 850 nm and especially glasses which are improved vis-a-vis the abovementioned disadvantages.

Another object is to provide improved novel optical steep edge filters.

Upon further study of the specification and appended claims, further objects and advantages of this invention will become apparent to those skilled in the art.

According to this invention, these objects are achieved with a glass of the following composition.

40 – 63 weight % $SiO_2$
8 – 30 weight % alkali metal oxides
14 – 30 weight % ZnO
0.9 – 9 weight % $TiO_2$
0 – 9 weight % $B_2O_3$
0 – 2.5 weight % $P_2O_5$
0 – 1.5 weight % $Al_2O_3$
0 – 2 weight % F
0 – 2 weight % CdO
0 – 2.5 weight % CdTe
0 – 1.65 weight % ZnS
0 – 2.0 weight % CdS
0 – 0.9 weight % S
0 – 0.9 weight % Se The minimum content of the coloring colloidal components CdO, CdTe, ZnS, CdS, S and Se or of any combination thereof being 0.5% by weight, and which may contain the following additional components:

GENERAL

0 – 0.8 weight % $As_2S_3$ or $As_2S_4$ or mixtures thereof
0 – 0.5 weight % $Sb_2S_3$ or $Sb_2S_5$ or mixtures thereof
0 – 6 weight % MgO
0 – 15 weight % CaO
0 – 8 weight % BaO
0 – 12 weight % SrO wherein the total of alkaline earth metal oxides +ZnO +CdO must not exceed 36 weight % and wherein the 8 to 30% alkali metal oxide preferably consists essentially of, or consists completely of 0 – 15 weight % of $Na_2O$ and/or 3 – 26 weight % os $K_2O$ A glass has been found particularly advantageous which has a content of 2 – 7 weight % of $TiO_2$ and optionally 0.3 – 2 weight % of F, 0.3 – 2.5 weight % of $P_2O_5$ in the presence of 0.1 – 0.5 weight % of $Al_2O_3$, 0 – 9 weight % of $Na_2O$, and/or 9.5 – 22.5 weight % of $K_2O$.

The glasses of this invention can be very satisfactorily produced with good homogeneity, without cords, and with few bubbles in a continuous process in the large melting units used for the production of optical glasses.

In the colored glass range according to the invention, it is possible to build up coloring mixed colloids in glass systems whose unique additive coloring action ensures the production of extremely steep edge filters with maximum selectivity extending into the short-wave infrared (edge $\lambda_H$ = 850 nm). The position of the steep absorption edge at $\vartheta$ = 0.50 ($\lambda_H$) can be adjusted with an accuracy of $\pm$ 2 nm.

Glass mixtures for glasses according to the invention are composed and thoroughly mixed in batches of up to 1500 kg in accordance with the syntheses such as are listed in Examples 1 to 6 described hereinafter.

Melting is effected in ceramic melting vessels at temperatures of from 1250° to 1320° C and is substantially dependent on the $SiO_2$ content and on the amount of alkali metal oxide added. With a calculated amount of glass of about 1000 kg the melting is completed in from 8 to 10 hours.

The glass of the invention has a viscosity of 320 – 1500 poises in the temperature range of homogenization, i.e., between 1150 and 950° C.

Refining and degasification of a colored molten glass of this kind are initiated at from 1230° to 1260° C and are completed in from 1 to 2 hours. After standing for from 3 to 4 hours at 1080° to 980° C, the molten glass is thoroughly homogenized with the aid of stirrers of the kind generally used in the production of optical glass.

The filter glass of high optical quality obtained in this manner is then cast in molds, rolled into sheets, or pressed into blanks.

After shaping, the filter glasses are subjected to temperature treatment (1 to 2 hours constant) at between 560° and 720° C in order to obtain the desired absorption edge of the glass. By periodically taking samples of glass plates during the temperature treatment, and spectrographically measuring them, the location of the absorption edge can be controlled.

For stress-relief, the filter glasses are generally treated in electrical or gas-heated furnaces, which slowly (2° to 10° C drop per hour) bring the hot glass down to normal temperature of about 25° C.

The final glass filters of this invention generally have a thickness of about 2 mm to 20 mm, are used in the conventional application for glass filters, e.g. photometry and photography.

BRIEF DESCRIPTION OF THE DRAWING

The attached drawing is a graph of transmission curves of Examples 1–6 of the invention, all the filters having a thickness of 3 mm.

PREFERRED EMBODIMENTS

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. In such examples, the compositions are in percent by weight.

EXAMPLES

| | 1 | 2 | 3 | 4 | 5 | 6 |
|---|---|---|---|---|---|---|
| $SiO_2$ | 45.85 | 60.00 | 48.725 | 46.85 | 42.20 | 43.10 |
| $B_2O_3$ | 3.85 | 8.85 | 3.45 | 3.25 | 3.55 | 3.90 |
| $Al_2O_3$ | 0.35 | 0.35 | 0.10 | 0.30 | 0.10 | — |
| $P_2O_5$ | ⅔ | ⅔ | 0.35 | 1.45 | 0.35 | — |
| F | 1.07 | 1.20 | 0.30 | ⅔ | 0.30 | — |
| $Na_2O$ | — | 4.53 | 9.30 | 9.00 | — | — |
| $K_2O$ | 22.55 | 5.85 | 9.80 | 12.00 | 22.20 | 22.20 |
| ZnO | 17.85 | 14.15 | 20.10 | 18.15 | 25.35 | 25.90 |
| CdO | — | 0.20 | 1.50 | 0.90 | 0.75 | — |
| $TiO_2$ | 5.55 | 1.20 | 5.85 | 6.00 | 2.95 | 1.00 |
| $As_2O_3$ | — | — | — | — | —0.45 | — |
| CdS | 0.90 | 1.40 | — | 0.45 | — | 0.33 |
| ZnS | 0.55 | 0.20 | — | 0.20 | 0.30 | 0.15 |
| $As_2S_3$ | — | — | — | — | 0.25 | 0.41 |
| S | — | — | 0.175 | — | — | — |
| Se | 0.03 | 0.57 | 0.35 | 0.35 | — | — |
| CdTe | — | — | — | — | 0.85 | 1.87 |
| $Na_2SeO_3$ | — | — | — | — | 0.50 | 0.69 |
| $ZnSeO_3$ | — | — | — | — | 0.35 | — |
| Absorption edge ($\pi_H$) | 475nm | 590nm | 630nm | 665nm | 780nm | 830nm |
| Climatic change resistance class | 1 | 1 | 1 | 1 | 2 | 3 |
| Acid resistance | 1 | 2 | 1 | 1 | ⅔ | ⅔ |

EXAMPLES-continued

| | 1 | 2 | 3 | 4 | 5 | 6 |
|---|---|---|---|---|---|---|
| Flaw resistance class | 0 | 0 | 0 | 0 | 1 | ⅔ |
| Viscosity (in poises) at 1000° C | 1200 | — | 550 | 350 | — | — |

EXAMPLE OF METHOD OF PRODUCTION

A description is given below of the production of a glass according to this invention, whose steep absorption edge lies at 645 nm. For 300 kg of glass, the following materials are weighed out and thoroughly mixed with the aid of a mixing machine:

137.760 kg of quartz flour
20.500 kg of boric acid
87.410 kg of calcined potassium carbonate
57.100 kg of zinc oxide
17.590 kg of titanium dioxide
4.500 kg of cadmium oxide
7.430 kg of potassium hydrogen fluoride ($KHF_2$)
4.390 kg of aluminum metaphosphate
1.200 kg of ammonium chloride
0.960 kg of zinc sulfide
1.680 kg of zinc selenite.

The resulting mixture is melted in a ceramic melting vessel at a temperature of from 1240° to 1280° C in 10 to 12 hours.

The refining of the molten glass to remove bubbles and other inclusions of difficultly meltable parts is effected at a refining temperature of 1260° – 1320° C and extends over a period of 3 to 4 hours.

The molten glass is then cooled to a melting temperature of 1000° – 1050° C and thoroughly homogenized with a stirrer (of the type generally used in the production of optical glass). The viscous molten colored glass is then poured into preheated iron molds or rolled out into sheets of a thickness greater than 3.0 mm.

The shaped glass pieces are then kept for some time at transformation temperature in a toughening furnace and finally brought to the so-called "tempering temperature" (560° – 660° C) until the desired edge absorption of 645 nm is obtained. Only then are the resulting glass products cooled with a temperature drop of about 2° C per hour until the shaped glass pieces are substantially stress relieved and can be further processed or polished.

The edge position of absorption filters produced in this manner can be obtained with an accuracy of up to ± 2 nm. A specific example of the overall geometric dimension of a glass filter is a circular disc of 3 to 350 mm in diameter and 3 to 20 mm thickness.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can made various changes and modification of this invention to adapt it to various usages and conditions.

What is claimed is:

1. A glass suitable for filters with steep absorption edges in the wavelength range of 455 to 850 nm, consisting essentially of:

40 – 63 weight % $SiO_2$
8 – 30 weight % alkali metal oxides
14 – 30 weight % ZnO
0.9 – 9 weight % $TiO_2$
0 – 9 weight % $B_2O_3$
0 – 2.5 weight % $P_2O_5$
0 – 1.5 weight % $Al_2O_3$
0 – 2 weight % F
0 – 2 weight % CdO
0 – 2.5 weight % CdTe
0 – 1.65 weight % ZnS
0 – 2.0 weight % CdS
0 – 0.9 weight % S
0 – 0.9 weight % Se
0 – 0.8 weight % $As_2S_3$ or $As_2S_4$ or a mixture thereof
0 – 0.5 weight % $Sb_2S_3$ or $Sb_2S_5$ or a mixture thereof
0 – 6 weight % MgO
0 – 15 weight % CaO
0 – 8 weight % BaO
0 – 12 weight % SrO
with the provision that the total of MgO, CaO, BaO, SrO, ZnO and CdO is not higher than 36% by weight, and that the minimum content of the colloidal coloring components, CdTe, ZnS, CdS, S and Se or of any combination thereof is 0.5% by weight.

2. A glass according to claim 1, wherein the 8 – 30 weight % alkali metal oxide consists essentially of
8 – 26 weight % $K_2O$, or
8 – 15 weight % $Na_2O$, or a mixture of
3 – 26 weight % $K_2O$ and
0 – 15 weight % $Na_2O$.

3. A glass according to claim 1, annealed in the transformation range from 560° to 720° C for the formation of color centers of CdO + ZnS + CdS + $As_2O_3$ and/or $As_2S_4$ + CdTe + Se + S.

4. A glass according to claim 1, wherein the weight % of $TiO_2$ is 2 – 7.

5. A glass according to claim 1, wherein the weight % of F is 0.3 – 2.

6. A glass according to claim 4, wherein the weight % of F is 0.3 – 2.

7. A glass according to claim 6, having on a weight % basis, 0.3 – 2.5 $P_2O_5$, 0.1 – 0.5 $Al_2O_3$, and 0 – 9 $Na_2O$ and/or 9.5 – 22.5 $K_2O$.

8. A glass filter having a steep adsorption edge in the wavelength range of 455 to 850 nm. produced from a glass according to claim 1.

9. A glass filter having a steep adsorption edge in the wavelength range of 455 to 850 nm. produced from a glass according to claim 3.

10. A glass filter having a steep adsorption edge in the wavelength range of 455 to 850 nm. produced from a glass according to claim 7.

11. A glass according to claim 1, containing Se in the form of $Na_2SeO_3$ or $ZnSeO_3$.

12. A glass filter according to claim 8, being a circular disc of 3 to 350 mm in diameter and 3 to 20 mm in thickness.

13. A glass according to claim 1 having a viscosity of 320–1500 poises at 1150°–950° C.

* * * * *